United States Patent [19]
Knowles et al.

[11] Patent Number: 5,272,213
[45] Date of Patent: Dec. 21, 1993

[54] SCORCH RETARDANT POLYACRYLATE ELASTOMERS

[75] Inventors: Eric Knowles, Thornton Cleveleys; David A. Cornforth, Rochdale; Francis M. Carney, Crumpsall, all of United Kingdom

[73] Assignee: Air Products and Chemicals, Inc., Allentown, Pa.

[21] Appl. No.: 883,333

[22] Filed: May 14, 1992

[51] Int. Cl.$^5$ .................. C08F 279/02; C08F 255/02
[52] U.S. Cl. .................. 525/305; 525/256; 525/281; 525/303; 525/329.3; 525/330.4; 525/333.9; 525/332.7; 525/349; 525/479
[58] Field of Search .............. 525/303, 305, 329.3, 525/334.1, 330.4, 332.5, 332.6, 332.7, 333.7, 333.9, 479

[56] References Cited

U.S. PATENT DOCUMENTS

| | | | |
|---|---|---|---|
| 3,202,648 | 8/1965 | Latourette et al. | 260/94.9 |
| 3,239,481 | 3/1966 | Meier | 525/345 |
| 3,335,124 | 8/1967 | Larsen | 260/94.9 |
| 3,578,647 | 5/1971 | Gregorian | 260/86.7 |
| 3,751,378 | 8/1973 | Cowperthwalte et al. | 260/4 |
| 3,954,907 | 5/1976 | Schober | 260/13 |
| 4,857,571 | 8/1989 | Reiter et al. | 524/519 |
| 4,931,508 | 6/1990 | Tobing | 525/194 |
| 4,983,685 | 1/1991 | Aoshima | 525/331.8 |

Primary Examiner—Christopher Henderson
Attorney, Agent, or Firm—Russell L. Brewer; James C. Simmons; William F. Marsh

[57] ABSTRACT

This invention pertains to scorch retardant systems for peroxide curable elastomers. Polyunsaturated monomers copolymerizable with the elastomer in the presence of peroxides are mixed with hydroquinone and sulfenamides and incorporated into elastomer formulations. The formulations are milled and cured. Excellent Mooney scorch times and hardness values, as well as other physical properties are obtained.

9 Claims, No Drawings

SCORCH RETARDANT POLYACRYLATE ELASTOMERS

FIELD OF THE INVENTION

This invention is directed to scorch retardant compositions suited for the vulcanization of elastomers.

DESCRIPTION OF THE PRIOR ART

The use of polyunsaturated monomers, and particularly polyacrylates and polymethacrylate monomer systems, for the curing and vulcanization of peroxide-curable elastomers to enhance physical properties of the resulting elastomers is known. Such property enhancements include high hardness, resistance to attack by sunlight, hydrocarbon solvents as well as water, physical strength, aging and the like. Free-radical reaction of the polyunsaturated monomers with the elastomeric compositions is conducted at elevated temperatures wherein the polyunsaturated compositions crosslink through an abstractable hydrogen atom on the elastomer.

Scorching is a problem associated with the curing of the elastomers in the presence of peroxide and scorching, in effect, is the result of prevulcanization of the elastomer. In prevulcanization the monomer crosslinks with the elastomer at low temperature resulting in products which have a rough texture, a shriveled appearance and its surface appearance is lumpy. Thus, they are unacceptable. To combat the problem of prevulcanization and scorching of the elastomer, it has been customary to add scorch retardants to the polyunsaturated monomer which in turn retard the rate of crosslinking between the elastomer and polyunsaturated monomer at low temperature. Although many types of scorch retardants have been incorporated into the polyunsaturated monomers for subsequent peroxide curing of elastomers, there have been problems. In terms of elastomer properties, the addition of the scorch retardants have been relatively ineffective during high temperature vulcanization or too effective in that they have retarded vulcanization to the extent that the resulting elastomers do not have the required physical properties. For example many have reduced elastic modulus and increased elongation. In terms of processing the elastomers, the scorch retardants often have extended the cure times to such an extent that costs become prohibitive or, because of their volatility, present environmental problems in the workplace due to odor and toxicity.

Several patents which disclose scorch retardant systems for inhibiting prevulcanization of elastomers including rubber and rubber type compositions are as follows:

U.S. Pat. No. 3,751,378 discloses a mechanism for inhibiting prevulcanization of rubber crosslinked with a polyfunctional methacrylate in the presence of peroxide. A scorch retardant of N-nitrosodiarylamine or N,N'-dinitrosodiphenyl-p-phenylenediamine is shown.

U.S. Pat. No. 4,857,571 discloses a method for the inhibiting the prevulcanization during free-radical curing of rubbers. The prior art section of the patent discloses that it was known to use acidic materials such as phthalic anhydride, salicylic acid and sodium acetate which act as retarders in sulfur vulcanization systems. Other known retarders include nitro so and nitroaromatic amines as well as various quinones e.g. p-benzoquinone and naphthoquinone. Retarders used by the patentees include modified alkyl-substituted aminoalkylphenols, an example of which is 2,6-di-t-butyl-4-[methyl(phenyl)amino]-n-propylphenol.

U.S. Pat. No. 3,954,907 discloses a method for avoiding scorching of ethylene polymer based compositions vulcanized in the presence of organic peroxide. The patentees disclose the use of monofunctional vinyl compositions as a scorch retarding agent. Antioxidants such as sterically hindered phenols are also suggested as an adjuvant.

U.S. Pat. No. 3,578,647 discloses a scorch prevention process for producing ethylene-containing polymers crosslinked by free radical generating crosslinking agents. The patentees employ the use of a chain transfer agent e.g., mercaptans and aldehydes as a scorch retarding or scorch preventing adjuvant.

U.S. Pat. No. 3,335,124 discloses method for controlling the rate of vulcanization of polyethylene through the use of a crosslinking regulator which heretofore were utilized or antioxidants. Various compositions having antioxidant activity and suited as a crosslinking regulator include aromatic-amines, phenolic compounds and ketone-aldehyde condensation products.

U.S. Pat. No. 3,202,648 discloses the addition of scorch inhibiting components during the free radical peroxide crosslinking of polyethylene. Alkyl, cycloalkyl and arylalkyl nitrites having from 5 to 18 carbon atoms are used as the scorch preventing additive.

SUMMARY OF THE INVENTION

This invention relates to a polyacrylate based scorch retardant formulation for use as a crosslinker system for the peroxide curing of elastomer compositions vulcanizable in the presence of the peroxide catalyst and to the curable elastomer system itself. The improved scorch retarding polyacrylate system comprises: a polyacrylate and an effective amount of a scorch retardant mixture comprising hydroquinone and a sulfenamide. Scorch retarding curable elastomers are formed by incorporating the polyacrylate based scorch retardant formulations into a peroxide-curable elastomer system. There are several advantages associated with the polyacrylate based scorch retardant compositions and the curable elastomers prepared therefrom and these include:

- an ability to formulate an easily handled scorch retardant polyacrylate system for vulcanizing peroxide-curable elastomers;
- an ability to formulate storageable, scorch retardant polyacrylate systems suited for forming peroxide-curable compositions;
- an ability to retard scorching of peroxide-curable elastomers during crosslinking with polyacrylate monomers while maintaining excellent rates of cure at vulcanization temperatures; and
- an ability to inhibit scorch in the vulcanization of peroxide-curable elastomers reacted with polyacrylates without significant environmental problems due to offensive odors and particularly offensive toxicity.

DETAILED DESCRIPTION OF THE INVENTION

This invention pertains to compositions suited for inhibiting or retarding the prevulcanization or scorching of peroxide-curable elastomers during cure with polyinsaturated monomers. The curable elastomers which are crosslinked with the polyunsaturated monomers are elastomeric organic high polymers, e.g., rubbers which are curable via free-radical crosslinking with polymerizable vinyl unsaturated monomers. In general, the free-radical curable elastomers are polymers having extractable hydrogen atoms which on reaction with the polymerizable monomers crosslink through carbon-carbon bonds. Representative examples of synthetic rubbery polymers formed via the polymerization of conjugated dienes, include polyisoprene, styrene-butadiene rubbers, polybutadiene rubbers, neoprene, and substituted butyl rubbers chlorinated polyethylene rubber. Other elastomers are based upon vinyl polymerization and include polymers such as polyethylene, polypropylene, ethylene-propylene rubbers, butadiene-acrylonitrile elastomers, silicone elastomers and copolymers containing ethylene and propylene units e.g. ethylene-vinyl acetate copolymers and the like. The patents described in the prior art section herein suggest many representative elastomer systems and are incorporated by reference.

The scorch retarding curatives for peroxide curable elastomers comprise a polyfunctional unsaturated monomer, typically a polyacrylate monomer, and an effective amount of a scorch retardant inhibitor and vulcanizate accelerator, the scorch retarder being hydroquinone and the vulcanizate accelerator being a sulfenamide. The polyfunctional unsaturated monomer generally is admixed with the polyunsaturated monomer acrylate and generally is a component of the scorch retarding curative; it is polyfunctional in that it has a plurality of unsaturation units for crosslinking with the elastomers. Preferably it is a liquid at temperatures below about 50° C. The use of polyacrylates in the vulcanization of peroxide curable elastomers is conventional. Examples of polyfunctional acrylates include those acrylic and methacrylic acid esters of $C_{2-12}$ polyols and alkoxylated derivatives containing from 2–6 alkyleneoxide units. Preferably the polyols have from 2–8 carbon atoms and preferably they are diols and triols. Specific polyacrylates are: trimethylolethane triacrylate, trimethylolpropane trimethacrylate, pentaerythritol tetramethylacrylate, glycerol trimethyacrylate, glycerol triacrylate, 1,3-butylene glycol dimethylacrylate, ethylene glycol dimethacrylate, 1,4-butylene glycol dimethacrylate, polyethylene glycol dimethacrylate and so forth.

Other polyunsaturated monomers which may be used by themselves or in combination with the polyacrylates include the polyallyl derivatives of polyols, such as, the allylic ethers of trimethylolpropane, pentaerythritol, ethylene glycol, glycerol, polyethylene glycol and polypropylene glycol and the like; triallylmellitate, diallylphthalate, diallylchloroendate, triallylcyanurate, and triallylisocyanurate.

One component of the scorch retardant system is an organosulfenamide. These compounds have been used in rubber formulations as delayed action accelerators. The sulfenamides are represented by the formulas:

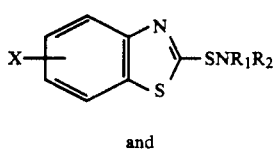

and

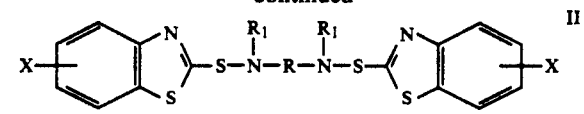

wherein
R is $C_{1-10}$;
$R_1$ is H, $C_{1-10}$ aliphatic, aryl, cycloalkyl or aralkyl;
$R_2$ is $C_{1-10}$ aliphatic, aryl, cycloalkyl or aralkyl, or combined with $R_1$ forming a heterocyclic group; and,
X is hydrogen, halogen, hydroxy, $C_{1-6}$ lower alkyl, $C_{1-6}$ alkoxy.

Examples include N-t-butylbenzthiazylsulfenamide; N,N-dicyclohexylbenzothiazolesulfenamide; N,N-diisopropyl-2-benzothiazolesulfenamide; 2-(4-morpholino)thiobenzothiazole (MTB); N-t-butyl-2-benzothiazolesulfenamide; and N-cyclohexyl-2-benzothiazolesulfenamide.

Another component of the scorch retardant system is hydroquinone. In the past, quinones have been used as shortstop agents in polymerization processes, e.g. in the polymerization of olefins such as butadiene and styrene. Other quinones or polymerization inhibitor, even though they act to retard the rate of vulcanization, do not give the desired result when combined with the sulfenamide during the peroxide curing of elastomer with polyacrylates.

One highly acceptable method for incorporating the scorch retardant additive for curing of the elastomer involves mixing the hydroquinone and sulfenamide with the polyacrylate and then coating the resulting liquid mixture onto an inert solid phase substrate. The material then can be packaged and stored for extended periods of time at ambient temperatures. Examples of substrates suited for coating the mixture of polyacrylates monomers and scorch retardants include powdered silica, diatomaceous earth, clays and the like.

The scorch retardant system of hydroquinone and sulfenamide also can be added separately or jointly to the elastomer during milling with the polyunsaturated monomer. However, it is preferred that the scorch retardant additives be mixed with the polyunsaturated monomer and the resultant mixture added to the elastomer.

The scorch resistant polyunsaturated monomer or polyacrylate systems for effecting vulcanization of curable elastomeric organic high polymers typically are formulated on the basis of one hundred weight parts monomer, e.g., polyacrylate. The scorch retardant system then is incorporated into the curable elastomer in conventional amounts from about 0.5 to 50 weight parts polyunsaturated monomer per one hundred weight parts elastomer. (These values may be expressed as weight percent.) When using polyallylic functional monomers, higher levels may be used than when using polyacrylates. For polyacrylates the level of polyacrylate vis-a-vis the curable elastomer generally is from 1 to 50 parts per 100 parts elastomer. Higher levels may be used but seldom are for reasons of cost; the addition level is primarily at the discretion of the formulator and thus depends on the nature of the elastomer to be produced. In formulating the scorch retardant system the range of hydroquinone based upon polyacrylate is from 0.2 to 6 parts by weight per one hundred parts by weight polyacrylate. The sulfenamide also present in a proportion of from about 1 to 30 typically 2 to 20 weight parts per 100 weight parts of polyacrylate. When less than about 0.2 parts hydroquinone are used in the scorch retardant-polyacrylate system, there may be insufficient inhibitor to prevent even modest levels of scorching during cure. Higher levels may be required depending upon vulcanization temperatures and vulcanization times as well as the elastomeric organic high polymers and polyunsatured momomers themselves. Too much hydroquinone may overly extend cure cycles and result in insufficiently cured elastomers.

Typically, the vulcanization or crosslinking of the curable elastomers is effected through free radical initiation by the addition of a free-radical generating compound or via a radiation source, e.g., a high energy electron source. Although many systems will cure at high temperature, high temperatures may result in unacceptable product if cure temperature is too high. Generally, then polymerization is effected by initiating reaction through the addition of a free radical generating compound which is usually an organic peroxide. Organic peroxides suited for abstracting hydrogen from the elastomer are known and those conventionally used can be used in the practice of this invention for vulcanizing elastomers. Organic peroxides which can be used include ditertiary peroxides and these include benzoyl peroxide, 1,3-bis-t-butylperoxyisopropylbenzene; 1,1-bis(t-butylperoxy)3,3,5-trimethylcyclohexane; 2,5-dimethyl-2,5-bis(t-butylperoxy)hexane; di-α-cumyl peroxide; and ditertiary peroxides such as di(tert-peroxy)-butane; tert-butyl-methylcyclohexyl peroxide and dibenzoyl peroxide. Other peroxides include tert-butyl perbenzoate, tert-butyl perphthalate, and so forth.

Radiation of the polymers would be an acceptable method depending on use and cost over chemical free radical initiatiors. However, any conventional process may be used.

The elastomeric compositions can be processed in conventional manner typically involving the milling of a masterbatch formulations in roll mills and then curing the milled masterbatch in molds or presses. Various additives can be added to the elastomer for imparting desirable properties thereto and examples of additives include carbon black, antioxidants, wetting agents and reinforcing pigments and fillers. Examples of reinforcement and fillers include fine particles, zinc oxide, calcium carbonate, calcium silicate, amorphous hydrated silica, fine clays, magnesium carbonate and carbon black. The addition of various additives to achieve desired properties is at the discretion of the processor.

The following examples are provided and illustrate various embodiments of the invention and provide comparisons against the prior art.

EXAMPLE 1

Scorch Retardant Systems for Elastomers Effect of Level of Scorch Retardent

Vulcanization of butadiene-acrylonitrile rubbers was carried out in conventional manner in a roll mill and then placing the milled system into a mold. Varying levels of scorch retarding additives of hydroquinone and sulfenamide were compared. The scorch retardant systems were formulated by mixing the hydroquinone and sulfenamide with the trimethylolpropane triacrylate and coating the resulting mixture onto powdered silica. Scorch time to determine cure characteristics was evaluated on the basis of Mooney scorch time according to ASTM 1646-80. The formulations were cured at 160° C. and physical properties i.e. hardness measured. The conditions and results are set forth in Table 1. The masterbatch formulation is as follows:

|  | Parts (by wt) |
|---|---|
| NBR N367C70 Nitrile Rubber | 100 |
| FEF Carbon Black N550 | 40 |
| Zinc Oxide | 5 |
| Stearic Acid | 1 |
| Trimethylolpropane Trimethacrylate | 15 |
| Vulcup 40KE (peroxide) | 5 |
| N-t-butylbenzthiazylsulfenamide | TABLE 1 |
| Hydroquinone | TABLE 1 |

Nitrile Rubber is a butadiene-acrylonitrile rubber
Vulcup 40KE is 1,3-bis-t-butylperoxyisopropylbenzene at 40% activity

TABLE 1

| SULFEN-AMIDE* | HYDRO-QUINONE* | SCORCH TIME AT 121° C. (min) | IRHD HARDNESS |
|---|---|---|---|
| 1 | 1 | 48 | 76.5 |
| 0.5 | 1 | 54 | 74.5 |
| 1 | 0.5 | 48 | 79 |
| 0.5 | 0.5 | 47 | 78.5 |
| 1 | 0.25 | 49.5 | 84 |
| 0.5 | 0.25 | 43.5 | 85 |

TABLE 1 shows a combination of both additives yields desirabble products. A level of hydroquinone or less than 0.5% by weight of the trimethylolpropane trimethacrylate provided higher hardness levels in the cured elastomer, although all levels are acceptable.

EXAMPLE 2

Elastomers Cured with Triallylcvanurate (TAC) No Sulfenamide

The procedure of Example 1 was repeated using the following masterbatch formulation. No sulfenamide was used in the cure and delayed action was sought to be achieved through addition of hydroquinone to the methacrylate monomer. The scorch retarding monomer, TAC, was also tested for comparison.

| Vistalon 7500 EPDM | 100 PTS |
|---|---|
| FEF Carbon Black N550 | 100 |
| Struckpar 2280 Process Oil | 45 |
| Antioxidant TMQ | 1 |
| Trimethylolpropane trimethacrylate | 2 |
| Vulcup 40KE (peroxide) | 5 |

Vistalon 7500 EPDM is an ethylene/propylene rubber which is commercially available.

TMQ antioxidant is polymerized trimethyldihydroquinone.

Additions of hydroquinone expressed as weight percent of the trimethylolpropane trimethacrylate co-agent gave results as follows:

TABLE 2

| HQ LEVEL | TAC | SCORCH TIME AT 131° C. (min) | HARDNESS |
|---|---|---|---|
| 1.07% | — | 11 | 56 |
| 12.5% | — | 12.5 | 56 |
| — | 2 | 27 | 55 |

As can be seen from Table 2, when 2 parts TAC were used as the coagent (with no added scorch retardant), the elastomer had a scorch time of 27 min and a hardness of 55. When the methacrylates were used, the addition of hydroquinone as the sole scorch retarder failed to give as good a scorch retardant.

EXAMPLE 3

Ethylene-Propylene Rubbers

The procedure of Example 2 was repeated except sulfenamide was added along with polyacrylate and hydroquinone in forming the co-agent formulation. Table 3 provides data at 5 parts and 3 parts trimethylolpropane trimethacrylate as follows. The masterbatch formulation was comprised:

|  | Parts (by wt) |
| --- | --- |
| Keltan 4802 EPDM | 100 |
| FEF Black | 85 |
| Sunpar 2280 Process Oil | 30 |
| Antioxidant TMQ | 1 |
| N-t-butylbenzthiazyl sulfenaide | Table 3 |
| Vulcup 40KE | 9 |
| Hydroquinone | 1.7 |

Kelton 4802 is an ethylene/propylene rubber which is commercially available.

TABLE 3

| TRIMETHYLOLPROPANE TRIMETHACRYLATE | | |
| --- | --- | --- |
| SULFENAMIDE LEVEL | SCORCH TIME AT 121° C. (min) | HARDNESS |
| CO-AGENT 5 PTS. | | |
| 0.25 | 19.5 | 71 |
| 0.5 | 24.5 | 71 |
| CO-AGENT 3 PTS. | | |
| 0 | 14 | 73 |
| 0.25 | 19 | 70 |
| 0.5 | 19 | 72 |

When comparing the results with those of Example 2, it is generally recognized that the standard methacrylate grades give superior physical properties as evidenced by the high hardness values relative to the TAC cured product. The methacrylate grades suffer primarily from the scorch problem. The addition of the sulfenamide to the polymethacrylate formulation resulted in higher Mooney scorch times. Also, these results show generally longer levels of scorch time than those obtained with hydroquinone alone, indicating that both components are required in order to confer with desired activity.

EXAMPLE 4

Comparison of Hydroquinone to Other Polymerizaton Inhibitors

The procedure of Example 1 was repeated but using a different masterbatch formulation as follows:

| Nitrile Rubber BR 1042 | 100 pts. |
| --- | --- |
| Zinc Oxide | 5 pts. |
| Stearic Acid | 1 pt. |
| FEF Carbon Black | 40 pts. |
| Dicumyl peroxide | 4 pts. |
| Trimethylolpropane trimethacrylate | 15 pts. |

Various potential scorch additives were added at a level of 5% W/W relative to the acrylate monomer. Table 4 sets forth the test results:

TABLE 4

| Scorch Retardant Additive | Mooney Scorch at 121° C. Mins. | Hardness* IRHD |
| --- | --- | --- |
| None | 8.33 | 84 |
| Hydroquinone | 60 | 46 |
| Antioxidant 2246 | 10.06 | 79 |
| Phenyl B-naphthylamine | 8.48 | 83 |
| Santowhite Crystals | 11.14 | 84 |

* After 60 mins cure at 160° C. Antioxidant 2246 is 2,2-methylene bis 4,methyl,6-t-butyl phenol. Santowhite Crystals is a Monsanto product.

This demonstrates that hydroquinone is unique in its ability to extend scorch time, but that it does so at a very unacceptable reduction of hardness when used alone at higher levels.

EXAMPLE 5

Diethyleneglycol dimethacrylate Comparison with Triallylcyanurate Low Level Polyunsaturated Monomer in Cure The procedure of Example 1 was repeated except for the use of a different masterbatch formulation. One co-agent composition was prepared consisting of diethylene glycol dimethacrylate (83.3%), hydroquinone (1.7%) and N-t-butylbenzthiazylsulfenamide (15%). That formulation was compared with an identical masterbatch formulation in which TAC was substituted for the diethylene glycol dimethylacrylate and without the addition of scorch additives. Table 5 sets forth the test results.

| Ingredients | Parts (by wt) |
| --- | --- |
| Vistalon 7500 EPDM | 100 |
| N550 Black | 100 |
| Paraffinic Oil | 45 |
| Antioxidant TMQ | 1 |
| Coagent Monomer | 2 |
| Vulcup 40KE peroxide | 5 |

TABLE 5

| | Coagent Monomer 2 Parts | |
| --- | --- | --- |
| | DIMETHACRYLATE | TAC |
| Scorch Time at 121° C. (min) | 53 | 45 |
| Hardness | 57 | 60 |
| Compression Set % (22 hr at 160° C.) | 23.6 | 34.2 |
| Elongation at break % | 360 | 315 |
| Tensile Strength (MN.m$^{-2}$) | 14.5 | 15.7 |

The results show that the dimethacrylate cured system had improved scorch time, compression set and elongation compared to TAC. Hardness was slightly reduced and tensile strengths were approximately equivalent.

EXAMPLE 6

Low Level Trimethylolpropane trimethacrylate - TAC

The procedure of Example 5 was repeated except only 30 pts of paraffinic oil, and a coagent consisting of trimethylolpropane trimethacrylate (83.55), N-t-butylbenzthiazylsulfenamide (15) and hydroquinone (1.45), parts were used. Table 6 sets forth the test results.

TABLE 6

| | Coagent 2 Parts | |
| --- | --- | --- |
| | METHACRYLATE | TAC |
| Scorch Time at 121° C. | 24.5 | 22.5 |

TABLE 6-continued

|  | Coagent 2 Parts | |
|---|---|---|
|  | METHACRYLATE | TAC |
| Hardness | 70 | 67 |
| Compression Set % (22 hrs at 160° C.) | 21.9 | 16.2 |
| Elongation at break | 255 | 235 |
| Tensile Strength (MN.m$^{-2}$) | 17.6 | 17.9 |

The results show that even at low levels of polyacrylate addition in the form of diacrylate and triacrylate the scorch retardant effect of the scorch retardant mixture was about equivalent to TAC and yet hardness was better and compression set somewhat poorer.

EXAMPLE 7

High Level of Process Oil Addition

The procedure of Example 6 was repeated except at higher levels of process oil addition. The system was compared to TAC systems. Using the Example 6 trimethylolpropane trimethacrylate co-agent composition in a rubber compound as above containing 65 parts of paraffinic process oil, data are as follows in Table 7.

TABLE 7

|  | Coagent 2 parts | |
|---|---|---|
|  | METHACRYLATE | TAC |
| Scorch Time | 77 | >120 |
| Hardness | 49 | 44 |
| Compression Set % (22 hrs at 160° C.) | 27.0 | 65.1 |
| Elongation at break % | 480 | 515 |
| Tensile Strength (MN.m$^{-2}$) | 12.0 | 6.9 |

The advantage of the scorch retarding polyacrylate systems over TAC systems is best emphasized at the highest loading levels of process oil. Hardness was better and tensile strength was nearly double. Compression set was considerably improved in the methacrylate system.

EXAMPLE 7

Scorch Retardation System in the Absence of Hydroquinone

The procedure of Example 1 was repeated except hydroquinone was omitted from the scorch retarding polyacrylate system. The sulfenamide derivative failed to give adequate scorch protection. The formulation consisted of:

|  | Parts (by wt) |
|---|---|
| Breon N3670 Nitrile Rubber | 100 |
| FEF Carbon Black | 40 |
| Zinc Oxide | 5 |
| Stearic Acid | 1 |
| DiCup 40C (peroxide) | 5 |
| Trimethylolpropane trimethacrylate | 15 |

|  | Parts (by wt) |
|---|---|
| N-t-butylbenzthiazylsulfenamide | 2 |

A Mooney Scorch of only 6½ minutes and a vulcanisate hardness of 81 was obtained thus showing the need for the scorch retarding additive, hydroquinone, in combination with the sulfenamide.

EXAMPLE 8

Vulcanization without Scorch Retardant Effect of Acrylate Functionality

The procedure of Example 1 was repeated except that the following masterbatch was used. No special addition of scorch-retardant agent(s) was made. The results are in Table 8.

| NBR B36C70 Nitrile Rubber | 100 |
|---|---|
| FEF Black | 40 |
| Zinc Oxide | 5 |
| Stearic Acid | 1 |
| Antioxidant TMQ | 0.5 |
| DiCup 40C (peroxide) | 7 |
| Polyacrylate Monomer (See Table 8) | 15 |

TABLE 8

| MONOMER | FUNCTIONALITY | SCORCH TIME AT 121° C. (min) | IRHD HARDNESS |
|---|---|---|---|
| TETRAHYDROFURFURYL METHACRYLATE | 1 | 24 | 63 |
| 1,3-BUTANEDIOL DIMETHACRYLATE | 2 | 9 | 81 |
| TRIMETHYLOLPROPANE TRIMETHACRYLATE | 3 | 7 | 84 |

These results show that polyunsaturated monomers without a scorch retarding agent scorch times were low. The monounsaturated monomer had better scorch time but at the expense of hardness. The appearance of the products showed severe scorching. Scorching became more severe, as expected, with increasing functionality of the polyacrylate and such scorch times were significantly lower for the higher functional polyacrylates. However, the polyunsaturated monomers cured elastomers had better and excellent hardness.

EXAMPLE 9

Effect of Hydroquinone on Vulcanization - No Sulfenamide

The procedure of Example 1 was repeated except that the percentage of hydroquinone was varied based on the trimethylolpropane methylacrylate. No sulfenamide was used. The results are set forth in Table 9.

TABLE 9

| % ADDITION OF HYDROQUINONE ON MONOMER | SCORCH TIME AT 121° C. (min) | IRHD HARDNESS |
|---|---|---|
| 0 | 7.5 | 84 |
| 0.5 | 16 | 82 |
| 1.0 | 25 | 76 |
| 3.0 | 58 | 60 |
| 5.0 | >60 | 50 |

The increasing levels of hydroquinone based on the weight of the polyacrylate extended the scorch time with increasing hydroquinone levels, but reduced the vulcanisate hardness. These results in terms of vulcanisate hardness are consistent with Example 1, and they also show the importance of sulfenamide addition.

EXAMPLE 10

Scorch Retardant Using Tetramethyl/Thiuram Monosulfide

The procedure of Example 1 was repeated, but using tetramethyl thiuram monosulfide in place of the sulfenamide. The results obtained are set forth in Table 10.

| Monosulfide | Hydroquinone | Scorch Time 121° C. | Hardness |
|---|---|---|---|
| 1 | 1 | 27.4 | 73 |
| 0.5 | 1 | 30.1 | 73.5 |
| 1 | 0.5 | 21.5 | 77 |
| 0.5 | 0.5 | 21.2 | 78 |

This demonstrates that the Monosulfide system has an interesting combination of properties, but that its performance is not as good as the preferred sulfenamide system.

EXAMPLE 11

Commercial Scorch Retardant and Effect

Two commercial scorch retardant systems were compared to the formulation of Example 1 in order to provide comparative performance requirements. The formulation was as follows:

| | |
|---|---|
| NBR N36C70 Nitrile Rubber | 100 |
| FEF Black N550 | 40 |
| Zinc Oxide | 5 |
| Stearic Acid | 1 |
| Monomer | 15 |
| Vulcup 40KE peroxide | 4 |

TABLE 8

| MONOMER | SCORCH TIME AT 121° C. (min) | IRHD HARDNESS |
|---|---|---|
| EXAMPLE 1 | 43.5 | 85 |
| TRIMETHYLOLPROPANE TRIMETHACRYLATE | 6¼ | 84 |
| COMMERCIAL PRODUCT 1 | 47.5 | 83 |
| COMMERCIAL PRODUCT 2 | 40.5 | 83 |

The results show similar scorch times and hardness for the scorch retardant systems described herein to established commercial systems.

EXAMPLE 12

Effect of N-Cyclohexylbenzythiazylsulfenamide

The procedure of Example 4 was repeated using the same masterbatch, but using N-cyclohexyl benzthiazyl sulfenamide at a level of 5% relative to the methacrylate monomer. This formulation gave a scorch time of 9.5 minutes at 121° C. and a vulcanisate hardness of 83 after cure for 60 mins at 160° C. This further demonstrates that sulfenamide by itself will not render the scorch properties adequate.

EXAMPLE 13

Effect of N-Cyclohexylbenzythiazylsulfenamide

The procedure of Example 1 was repeated except that the t-butyl-sulfenamide was replaced by N-cyclohexylbenzthiazylsulfenamide at a level of 3% relative to the methacrylate monomer. However, the combination was only slightly inferior to the commercial products of Example 11.

What is claimed is:

1. In a curable elastomer composition comprising an elastomer having an abstractable hydrogen atom crosslinkable with a polyacrylate, a polyacrylate, an organic peroxide, and containing a scorch retarding additive, the improvement which comprises the presence of from 0.2 to 6% by weight of hydroquinone based upon said polyacrylate and from 1 to 50% by weight of a sulfenamide based upon said polyacrylate, wherein the sulfenamide is represented by the formula:

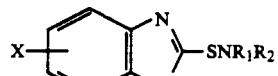

and

wherein
R is $C_{1-10}$;
$R_1$ is H, $C_{1-10}$ aliphatic, aryl, cycloalkyl or aralkyl;
$R_2$ is $C_{1-10}$ aliphatic, aryl cycloakyl or aralkyl, or combined with $R_1$ forming a heterocyclic group; and,
X is hydrogen, halogen, hydroxy, $C_{1-6}$ lower alkyl, $C_{1-6}$ alkoxy.

2. The curable elasomer composition of claim 1 wherein the sulfenamide is represented by formula 1 and R1 is hydrogen and R2 is aliphatic.

3. The curable elasomer composition of claim 2 wherein the polyacrylate is a polyacrylic or methacrylic ester of a $C_{2-12}$ polyol.

4. The curable elastomer composition of claim 3 wherein the polyol is $C_{2-8}$ diol or triol.

5. The curable elastomer composition of claim 4 wherein said sulfenamide is selected from the group consisting of N-t-butylbenzthiazylsulfenamide; N,N-dicyclohexylbenzothiazolesulfenamide; N,N-diisopropyl-2-benzothiazolesulfenamide; 2-(4-morpholino)thiobenzothiazole (MTB); N-t-butyl-2-benzothiazolesulfenamide; and N-cyclohexyl-2-benzothiazolesulfenamide.

6. The curable elasomer composition of claim 5 wherein the elastomer is selected from the group consisting of polyisoprene, styrene-butadiene rubbers, polybutadiene, neoprene, butyl, chlorinated polyethylene ethylene-propylene, and butadiene-acrylonitrile rubbers, polyethylene, polypropylene, silicone elastomers and ethylene-vinyl acetate copolymers.

7. The curable elasomer composition of claim 6 wherein the weight parts hydroquinone per 100 parts polyacrylate are from 0.5 to 5.

8. The curable elasomer composition of claim 7 wherein the sulfenamide is present in an amount from 2 to 20 parts per 100 (by wt.) parts polyacrylate.

9. The curable elasomer composition of claim 8 wherein the sulfenamide is N-t-butylbenzthiazylsulfenamide.

* * * * *